July 22, 1958 — W. H. DU SHANE — 2,844,083
HITCH DEVICE
Filed April 7, 1953 — 2 Sheets-Sheet 1

INVENTOR.
WALLACE H. DU SHANE
BY
ATTORNEYS

July 22, 1958     W. H. DU SHANE     2,844,083
HITCH DEVICE

Filed April 7, 1953     2 Sheets-Sheet 2

INVENTOR.
WALLACE H. DU SHANE
BY
ATTORNEYS

United States Patent Office 2,844,083
Patented July 22, 1958

2,844,083
HITCH DEVICE

Wallace H. Du Shane, Waterloo, Iowa, assignor to Deere Manufacturing Co., Dubuque, Iowa, a corporation of Iowa Application April 7, 1953, Serial No. 347,205

23 Claims. (Cl. 97—46.93)

The present invention relates generally to agricultural implements and more particularly to hitch devices and the like for connecting a ground-engaging or ground-working implement with a propelling tractor.

The object and general nature of the present invention is the provision of a hitch device characterized by its automatic response to draft variations so that with an increase in draft the virtual hitch point is moved rearwardly relative to the tractor, thus raising the line of draft in response to an increase in the amount of draft. Further, it is another feature of this invention to provide a hitch device in which, in response to an increase in the amount of draft, the implement is tilted backwardly or rearwardly, so that, in the case of ground-working tools, the depth of operation of the implement is automatically decreased.

An additional feature of this invention is the provision of a hitch device for connecting implements having three-point attaching linkages with a tractor, the hitch device being so constructed and arranged that the lower attaching link is connected with the tractor by a resilient or yielding connection, as through a draft-transmitting spring or the like, with the upper link connecting means being so constructed and arranged as to be moved through a relatively greater extent than the lower traction link. One particularly important feature of this arrangement is that, in the case of a plow, for example, when the implement is lowered from a transport position to an operating position, the plow will be tilted or nosed downwardly at the moment the plow point first comes into engagement with the ground, thereby providing a relatively fast entry.

These and other objects and advantages of the present invention will be apparent to those skilled in the art after a consideration of the following detailed description, taken in conjunction with the accompanying drawings, in which.

Figure 1:
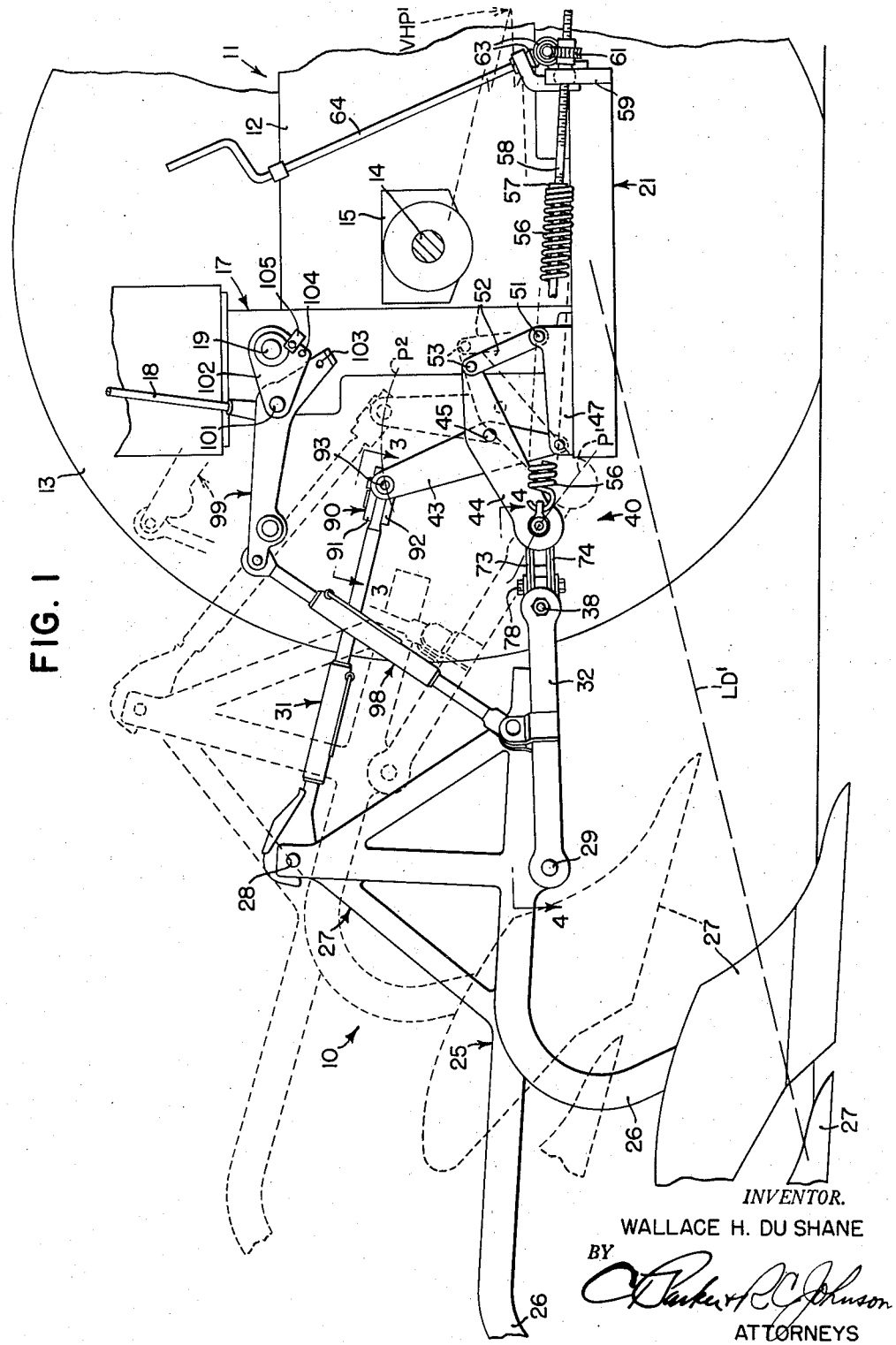
Figure 1 is a side view of a tractor and implement combination in which the principles of the present invention have been incorporated.
Figure 3:
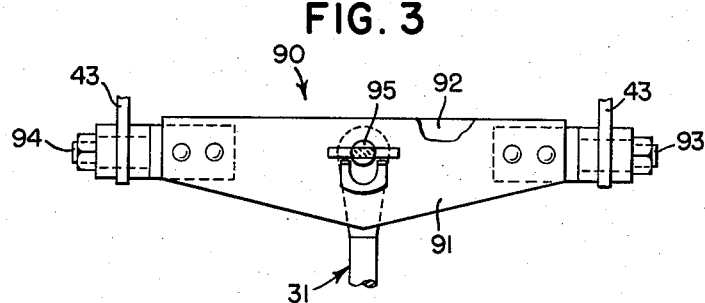
Figure 3 is a fragmentary view taken generally along the line 3—3 of Figure 1.

For the purposes of illustrating the present invention, the same has been shown as incorporated in the connection between an implement 10, which has been shown as a two-bottom plow, and a farm tractor 11 of conventional construction so far as the present invention is concerned. Briefly, the tractor comprises a body 12 carrying a suitable power plant and supported on front and rear wheels, the latter being shown at 13 and mounted on axle shafts 14 that extend outwardly from rear axle extensions 15. The tractor 11 also includes a power lift unit 17 which comprises suitable hydraulic mechanism controlled by a valve handle 18 and having an operating member in the form of a transverse rockshaft 19 operable controllably by power derived from the power plant of the tractor. The latter also includes a drawbar support 21 fixedly connected underneath the generally central portion of the rear axle of the tractor.

The implement 10 includes a plow frame 25 having a pair of standards 26, to each of which a plow bottom 27 is fixed. The forward portion of the plow frame 25 includes a generally upwardly extending frame or mast section 27 providing upper and lower link-receiving points 28 and 29, the latter being in the form of a pair of laterally outwardly extending studs. Implements of this type are sometimes referred to as three-point implements, inasmuch as they are adapted to be connected to a propelling tractor by means of an upper draft link and a pair of laterally spaced apart lower draft links, and in the implement 10 the upper link is indicated by the reference numeral 31 and the lower links by the reference numerals 32 and 33. So far as the broad aspects of the present invention are concerned, these links may be conventional. However, according to the present invention, the lower link means 32 and 33 includes or receives a forward crossbar or transverse member 35, to one end of which the forward end of the link 33 is rigidly connected, as by welding, these parts being further braced by a diagonal member 36 that at its ends is welded to the rear end of the link 33 and the right end of the transverse bar 35. The other tension link member 32 is connected by a ball and socket joint 37 with a stud 38 that is carried at the right end of the rear transverse bar 35. The rear ends of the lower links 32 and 33 are connected with the implement studs 29 by ball and socket connectors 39. Similarly, the rear end of the link 31 is connected with the point 28 on the implement by a ball and socket connector which, so far as the present invention is concerned, may be conventional.

Figure 2:
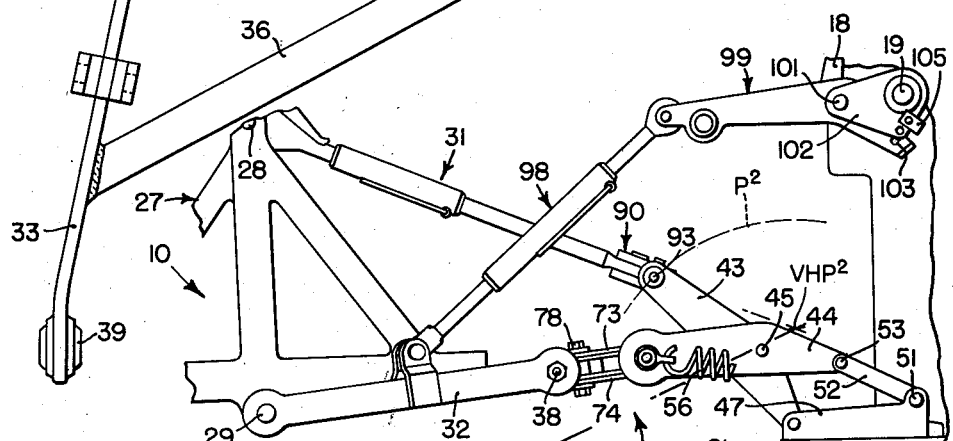
Figure 2 is a fragmentary view similar to Figure 1, showing the position of the connecting linkage under conditions of increased draft or overload.

The hitch mechanism with which the present invention is more particularly concerned is indicated in its entirety by the reference numeral 40 and, as best shown in Figures 1 and 2, includes two pairs of crossed and pivotally interconnected links 43 and 44, the pivot interconnection between these parts being indicated at 45. As will best be seen from Figure 1, the pivot 45 is located fairly close to the pivotal connection between the lower end of the link 43 and the tractor but at an appreciably greater distance from the upper end of the link 43. This constitutes, in effect, a motion-multiplying means so that, as explained below, the upper or rear end of the link 43 moves through a greater distance than the corresponding movement of the rear end of the lower link 44, as will be seen by comparing Figures 1 and 2. The links extend, generally speaking, in a fore-and-aft direction, particularly in the case of the links 44 which are subsequently referred to as the lower links while the other links 43 are referred to as the upper links that at their rear or upper ends are connected with the forward end of the compression link 31 by means which will be described below in detail. The lower or forward ends of the links 43 are pivotally mounted on support means in the form of brackets 47 carried in any suitable way on the tractor, as by being mounted on the rear portion of the drawbar support 21. The latter means also carries forward brackets 51 which pivotally receive generally upwardly extending links 52 to which the forward ends of the lower links 44 are connected, as by pivots 53. The rear ends of the lower links 44 are connected, by means which will be described below, with the forward ends of the lower draft-transmitting links 32 and 33. The links 43 and 44, and their lengths and points of pivotal interconnection, are so arranged and constructed that they are caused to swing together, the rear ends of the links 44 moving generally through the path $P^1$ while the upper or rear ends of the links 43 move through the path P², these paths converging rearwardly as will be clear from the dotted lines shown in Figures 1 and 2.

The pivotally interconnected links 43 and 44 are restrained against rearward swinging by a pair of draft-resisting springs 56, one disposed at each side of the tractor. The forward end of each of the springs 56 receives an anchoring member 57 to which the rear end of a connecting rod 58 is attached, as by any suitable means. The forward end of the connecting rod 58 is screw-threaded and passes through an anchoring bracket 59 that is fixed to the tractor in any suitable way. A worm wheel 61 is carried by the bracket 59 and rotatably receives the threaded end of the associated rod 58. The worm wheel 61 is adapted to be turned by a pair of bevel gears 63, one of which is fixed to the lower end of an operating crank member 64, the upper end of which is disposed in a position to be operated from the tractor seat. Any other suitable adjusting means for shifting the front ends of the springs 56 may be provided, as desired.

Figure 4:
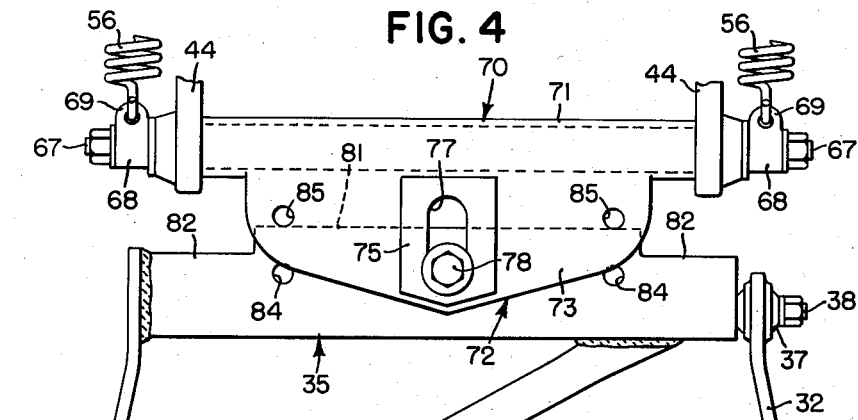
Figure 4 is a fragmentary view taken generally along the line 4—4 of Figure 1.

Referring now to Figure 4, it will be seen that the rear ends of the lower link members 44 are rigidly interconnected by a cross shaft 67 and at each end the shaft carries a swivel member 68 having a forwardly extending eye 69 to which the rear end of the associated spring 56 is connected. The shaft 67 forms a part of a transverse bar member that is indicated in its entirety by the reference numeral 70 and which includes, in addition, a transverse sleeve 71 having a plate-like rearward extension 72, the latter including upper and lower plate sections 73 and 74. The plates 73 and 74 are provided centrally with reenforcing sections 75, and the plates, with associated sections 75, are formed with elongated, generally fore-and-aft extending slots 77 in which a connecting pin or bolt 78 is disposed. The latter member is carried by a second or rear bar or transverse member referred to earlier by the reference numeral 35.

The rear crossbar or transverse member 35 is of particular construction. Centrally, it is formed with a web section 81 carrying the pin 78, and at each side of the web section 81 the member 35 is provided with forwardly facing edges 82 that, when the member 35 is shifted forwardly toward the forward bar member 70, are adapted to engage the rear ends of the links 44 and thus limit the forward movement of the part 35. In addition, the engagement of the edge portions 82 of the bar member 35 with the rear ends of the links 44 serve to prevent the implement from swinging laterally relative to the links 44, and hence relative to the tractor itself. However, when the pin 78 occupies a position in the rear end of the slot 77, as shown in Figure 4, the implement is permitted to have lateral swinging relative to the tractor. The web portion of the member 35 and the plate sections 73 and 74 are formed with apertures 84 and 85 that are located so as to be in axial registry when the bar member 35 is disposed substantially against the bar member 70. By inserting pins in these registering openings lateral swinging of the implement relative to the tractor may be prevented.

The upper or rear ends of the upper links 43 are interconnected by an upper crossbar 90 that comprises upper and lower transverse plate sections 91 and 92 secured, as by welding, in vertically spaced apart relation to a pair of end studs 93 and 94 that extend through openings in the rear or upper ends of the upper links 43. Centrally, the plate sections 91 and 92 are apertured and receive the flattened section of the forward portion of the upper compression link member 31, the latter being connected for lateral swinging with the central portion of the upper bar member 90 by a hitch pin 95 or the like.

The implement 10 is raised and lowered by a pair of lift links 98 that are connected at their lower ends with the draft links 32 and 33 and at their upper ends to lifting arms 99 that are connected with the rockshaft 19, whereby rocking movement of the latter serves to raise and lower the implement. The power lift mechanism 17 is so constructed and arranged, conventionally, to permit the implement and arms 99 to move upwardly without restraint, and generally the power lift rockshaft 19 is set so as to dispose the arms 99 in a position sufficiently low so that the passage of the tractor, over a ridge or the like, or other uneven terrain, will not bodily lift the plow out of the ground. If desired, and as illustrated in Figure 1, each of the lifting arms 99 may be provided with a pivot connection, as at 101, with a hub section 102 fixed to the associated end of the rockshaft 19, and each arm 99 may also have an opening 103 that is adapted to register with the corresponding opening 104 formed in the lower portion of the associated hub 102. Normally, the lifting arms 99 may swing upwardly without restraint, relative to the hub sections 102, but downward movement of the rear ends of the lift arms 99 is limited by stops 105, the latter being located so that when the stops engage the front ends of the lift arms 99, the soles 103 and 104 are in registry and, if desired, the lift arms 99 may be locked to the hubs 102 by pins or the like.

The operation of the hitch device of the present invention as described above is substantially as follows:

When the plow is first lowered from its transport position, as indicated in dotted lines in Figure 1, to a position in which the plow points first engage the ground, the springs 56 are substantially contracted, since the draft forces are negligible at this time, and therefore the swingably interconnected draft-transmitting links 43 and 44 are in their forwardmost position (dotted lines). The links 43 and 44, and associated parts, are so arranged that the upper or rear end of the link 43 moves through a greater extent of movement than the rear end of the lower links 44, and therefore when the links 43 and 44 are in their forwardmost position, the implement 10 is tilted generally forwardly so that the plow points are nosed downwardly, thereby providing for rapid entry into the ground. However, as the points enter the ground and the draft forces increase, the springs 56 yield so that the links 43 and 44 swing rearwardly and/or upwardly into the positions shown in full lines in Figure 1. When the links 43 and 44 are in their forwardmost position, the draft links 31, 32 and 33 are approximately parallel and extend forwardly and downwardly relative to the tractor, but when the draft forces increase to their normal values, the swinging of the links 43 and 44 toward and into their full-line position (Figure 1) establishes a virtual hitch point positioned approximately as indicated by the reference character VHP¹, with a line of draft about as indicated at LD¹ in Figure 1. It will be noted that when the implement first engages the ground, the hitch point is disposed low and well forward of the tractor since at this time the links 31 and 32, 33 are approximately parallel. This provides for approximately parallel lifting and lowering movement of the implement relative to the tractor between its ground-engaging and transport position. Thus, the lifting or raising of the implement into a transport position does not require excessive power.

If the plow should for any reason go too deep or encounter hard soil conditions, whereby the draft is increased, the links 43 and 44 will move generally rearwardly, and this has two effects. First, and more important, the virtual hitch point, or virtual center of rotation, moves generally rearwardly, as to some point such as VHP², shown in Fig. 2, rearwardly and upwardly with respect to the forward virtual hitch point VHP¹ so that the angle of the line of draft LD² between the implement and its center of rotation relative to the tractor is increased, thus tending to oppose any further increase in the depth of operation and, furthermore, exerting an increased force component tending to pull the plow to a position of more shallow depth of operation. In this way, when increased draft conditions are encountered, the links 43 and 44 automatically function to change the virtual hitch point or center of rotation so that the implement tends to move to a more shallow depth. Secondly, since the rear end of the upper link 43 moves through a greater extent than the rear end of the lower links 44, the implement, under conditions of increased draft or overload, is tilted generally backwardly or rearwardly, thus nosing the plow up, which also tends to cause the plow to move to a position of more shallow operation.

The upper or compression link 31 preferably is made adjustable longitudinally so as to provide proper fore-and-aft leveling for any tractor and implement combination, and also the right-hand lifting link 98 is made adjustable longitudinally to provide lateral leveling of the implement 10.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A hitch device for connecting an implement having upper and lower, generally horizontally extending attaching links with a tractor, said hitch device comprising a support attachable to the tractor, a pair of pivotally interconnected members swingably connected with said support, means on said members for receiving the front ends of said links, means interconnecting said members for causing them to move together, and spring means acting against one of said members to restrain generally rearward movement of said links when connected with said member.

2. A hitch device for connecting an implement with a tractor, said device comprising a pair of crossed links disposed, when attached to a tractor, in a generally vertical fore-and-aft extending plane and arranged with the rear end of one link generally above the rear end of the other, when said links are connected with a tractor, pivot means connecting said links at points intermediate their ends, means for pivotally connecting the forward end of one of said links with the tractor, means for swingably connecting the forward end of the other link with the tractor, and spring means connected with one of said links for resisting generally rearward movement thereof.

3. A hitch device as set forth in claim 2, further characterized by said links having such relative lengths that the rear end of said first mentioned link moves through a greater extent than the other link.

4. A hitch device comprising a pair of pivotally interconnected links adapted at their inner ends to be swingably supported on a tractor and at their outer ends to be swingably connected with upper and lower portions of an implement, and a draft-resisting spring means connected at one end with the link whose outer end is connected with the lower portion of said implement, said spring means being adapted to be anchored at its other end to the tractor.

5. A hitch device for connecting an implement having upper and lower, generally fore-and-aft extending draft links with a tractor, said hitch device comprising a pair of generally fore-and-aft extending arm means adapted to to be swingably connected with the tractor, said arm means being arranged in crossed relation, means pivotally interconnecting said arm means at their points of crossing so that when the rear end of one arm means at their points of crossing swings rearwardly and upwardly the rear portion of the other arm means swings generally rearwardly, means pivotally connecting the forward ends of said draft links with the rear ends of said arm means, and spring means connected with at least one of said arm means for yieldably resisting generally rearward movement of said arm means.

6. A hitch for connecting an implement having upper and lower draft links with a tractor, said hitch device comprising a first member, means for swingably connecting a forward portion of said member with the tractor, means for swingably connecting the rear portion of said member with the forward end of said lower draft link, a second member, means for connecting one portion of the latter member with the tractor, means pivotally connecting another portion of said second member with said first member, and means for swingably connecting the forward portion of said upper draft link with the rear portion of said second member.

7. A hitch device for connecting an agricultural implement with a tractor, comprising support means adapted to be connected to the tractor, a first arm means movably carried by said support means and having an end swingable generally fore and aft, a second arm means movably carried by said support means and having an end swingable in a generally fore-and-aft extending direction, motion-transmitting means interconnecting said first and second arm means so that when the rear end of the first arm means is swung generally rearwardly through a given extent the rear end of said second arm means is swung through a greater extent, means connecting the rear ends of said first and second arm means, respectively, with upper and lower portions of an agricultural implement, and yieldable draft-resisting means connected with said first arm means to resist generally rearward movement of the rear end thereof.

8. A hitch device for connecting an implement to a tractor, said hitch device comprising a first member adapted to be mounted on the tractor for movement relative thereto in a generally fore-and-aft direction, resilient draft-balancing means connected with said member to yieldably resist rearward movement thereof, means to connect the rear portion of said member with the implement, a second member adapted to be movably mounted on the tractor, means to connect said second member with the implement at a point generally above said first member, and motion-multiplying means connected between said members whereby when said resilient means yields, as under an increase in the draft, the resultant movement of said first member acts through said motion-multiplying means and said second member to tilt said implement upwardly and backwardly relative to the tractor.

9. A hitch device for connecting an agricultural implement with a tractor, comprising support means adapted to be connected to the tractor at each side thereof, a pair of pivotally interconnected arm means carried by said support means at each side of the tractor, each of said arm means having an end swingable generally fore and aft, a pair of laterally spaced apart lower draft links extending in a generally fore-and-aft direction and connected at their lower ends with the rear ends of the adjacent arm means, respectively, a crossbar pivotally connected at its ends with the rear end of the other arm means, and a generally fore-and-aft extending draft link connected at its forward end with said crossbar, the rear ends of said upper and lower draft links being adapted to be connected with the implement.

10. A hitch device for connecting an agricultural implement with a tractor, comprising support means adapted to be connected to the tractor at each side thereof, two pairs of first and second arm means, there being a pair of arm means disposed at each side of the tractor, the rear end of one arm of each of said pairs of arm means being disposed above the rear end of the other arm and the rear end of each arm of each of said arm means being swingable generally in a fore-and-aft direction, a cross member pivotally connected with the upper arm ends, a second cross member pivotally connected with the lower arm ends, and means carried by the generally central portion of said crossbars for receiving attaching links carried by the implement.

11. The invention set forth in claim 10, further characterized by means carried by said second crossbar for limiting lateral swinging of the implement relative to the tractor.

12. A hitch device for connecting an implement to a tractor, comprising a generally transversely disposed bar, a pair of members adapted to be swingably connected with the tractor and carrying said transverse bar, a second transverse bar, means pivotally connecting the intermediate portion of said second bar with said first transverse bar, means connected with and acting between said transverse bars for limiting the lateral swinging of the second bar relative to said first bar, and means for connecting the ends of said second bar with the implement, said last mentioned means including a first generally fore-and-aft extending member, means for rigidly connecting said latter member with said second transverse bar, and a second generally fore-and-aft extending link member swingably connected at its forward end with said second transverse bar.

13. A hitch device for connecting an implement with a tractor, said device comprising a first member, the rear end of which is connectible with the implement, means connecting said first member with a tractor for generally fore-and-aft movement relative thereto, resilient means connected to act between the tractor and the implement to yieldingly resist rearward movement of the rear end of said first member, a second member connectible at its rear end with the implement above said first member, and means connecting said second member with the tractor and said first member so that a given rearward movement of the latter member causes a greater rearward movement of the rear end of said second member.

14. A hitch device for connecting an implement with a tractor, said device comprising a first member connectible with the implement, means connecting said first member with a tractor for generally fore-and-aft movement relative thereto, resilient means connected to act between the tractor and the implement to yieldingly resist rearward movement of the implement and said first member, a second member disposed in a generally upwardly and rearwardly extending position, means for movably connecting the lower end of said second member with the tractor, means for movably connecting the upper end of said second member with the implement above said first member, and means pivotally connecting said second member at a point adjacent its lower end with said first member, whereby a given rearward movement of the latter member causes a greater rearward movement of the upper end of said second member.

15. A hitch device for connecting an implement having upper and lower, generally horizontally extending, attaching links with a tractor, said hitch device comprising a support attachable to the tractor, a pair of members swingably connected with said support, means pivotally interconnecting said members for causing them to move together, means on said members for receiving the front ends of said links, and resilient means acting against one of said members to restrain generally rearward movement of said links when connected with said member.

16. A hitch device for connecting an implement having upper and lower, generally fore-and-aft extending draft links with a tractor, said hitch device comprising a pair of arm means adapted to be swingably connected with a tractor, one of said arm means being movable in a generally fore-and-aft direction relative to the tractor, means to connect the rear end of said one arm means with the implement, the other arm means having a rear end disposed above the rear end of said one arm means, means interconnecting said arm means so that when said one arm means is moved in a generally fore-and-aft direction the rear end of said other arm means is moved through a greater extent in a generally fore-and-aft direction, resilient means connected with at least one of said arm means for yieldably resisting generally rearward movement thereof, and means to connect the rear ends of said arm means with upper and lower points on the implement.

17. A hitch device for connecting an implement having upper and lower generally horizontally extending attaching links with a tractor, said hitch device comprising a support attachable to the tractor, a pair of members having link-receiving ends and swingably connected with said support, means on said ends of the members for receiving the front ends of said links, means interconnecting said members for causing them to move together, and resilient means acting against one of said members to restrain generally rearward movement of said links when connected with said members.

18. The invention set forth in claim 17, further characterized by said interconnecting means including mechanism acting to cause the rear end of one of said members to move through a different extent of movement relative to the corresponding extent of movement of the other member.

19. A hitch device for connecting an implement having upper and lower generally horizontally extending attaching links with a tractor, said hitch device comprising a support attachable to the tractor, means adapted to be movably mounted on the tractor and including upper and lower portions to which the forward ends of said attaching links are respectively connected, said means including motion transmitting means constructed and arranged so that for a given rearward displacement of the lower portion of said movably mounted means said upper portion is moved rearwardly through a greater displacement, and resilient means connected with one of said upper and lower portions to yieldingly resist said rearward displacement.

20. A hitch device for connecting an implement having upper and lower generally horizontally extending attaching links with a tractor, said hitch device comprising a support attachable to the tractor, a member disposed approximately vertically and swingably connected at its lower end with said support and arranged so that its upper portion swings in a generally fore-and-aft direction, means connecting the lower of said attaching links to said member above its swingable connection with said support but below the upper portion of said member, means connecting the upper of said attaching links to the upper end portion of said member, and resilient means connected to yieldingly resist rearward swinging movement of said member.

21. In an agricultural implement such as a plow or the like provided with a ground-penetrating means having suction, adapted to be connected with a tractor to be propelled thereby, upper and lower generally horizontally disposed attaching links movably connected with the implement at points above said ground penetrating means, means adapted to be movably mounted on the tractor and including upper and lower portions to which the forward ends of said attaching links are respectively connected, said means including motion transmitting means constructed and arranged so that for a given rearward displacement of the lower portion of said movably mounted means, due to excessive soil pressure acting against said soil-penetrating means, said upper portion and the upper of said attaching links thereby angling said soil-penetrating means generally upwardly so as to cause the latter to seek a position of lesser depth, and resilient means connected with one of said upper and lower portions to yieldingly resist said rearward displacement.

22. The invention set forth in claim 21, further characterized by said tractor having power actuated lift means operatively connected with certain of said attaching links by means including lost-motion means whereby said attaching links, and the associated implement, may swing generally vertically without restraint due to said lift means, so as to accommodate automatic depth adjustment in accordance with the yielding of said resilient means.

23. A hitch device for connecting an implement having upper and lower generally horizontally extending attaching links with a tractor, said hitch device comprising a support attachable to the tractor, a member carried by said support and having a first portion movable in a generally fore-and-aft direction, means connecting the forward end portion of the upper of said links with said first portion, means connecting the lower of said links with said member whereby draft force transmitted between the implement and tractor acts against said member to shift said first portion thereof generally rearwardly, and resilient means acting against the lower of said links to yieldingly resist rearward movement thereof.

References Cited in the file of this patent

UNITED STATES PATENTS

| 1,529,425 | Ferguson | Mar. 10, 1925 |
| 1,634,501 | Jackson | July 5, 1927 |
| 2,471,636 | Martin | May 31, 1949 |
| 2,506,773 | Bunting | May 9, 1950 |
| 2,512,114 | Robinson et al. | June 20, 1950 |
| 2,515,637 | Dooley et al. | July 18, 1950 |
| 2,611,304 | Toland | Sept. 23, 1952 |
| 2,640,708 | Fraga | June 2, 1953 |
| 2,678,596 | Todd | May 18, 1954 |
| 2,697,973 | Silver et al. | Dec. 28, 1954 |
| 2,710,569 | Altgelt | June 14, 1955 |

FOREIGN PATENTS

| 837,329 | Germany | Apr. 21, 1952 |
| 1,025,436 | France | Jan. 21, 1953 |

UNITED STATES PATENT OFFICE

CERTIFICATE OF CORRECTION

Patent No. 2,844,083                                                    July 22, 1958

Wallace H. Du Shane

It is hereby certified that error appears in the printed specification of the above numbered patent requiring correction and that the said Letters Patent should read as corrected below.

Column 5, lines 66 and 67, strike out "at their points of crossing"; line 74, after "hitch" insert --device--.

Signed and sealed this 14th day of October 1958.

(SEAL)
Attest:

KARL H. AXLINE                                                     ROBERT C. WATSON

Attesting Officer                                                Commissioner of Patents